Nov. 8, 1960 O. E. A. ASPEGREN Re. 24,894
METHOD OF PYROLYSIS OF FUEL
Original Filed June 16, 1952
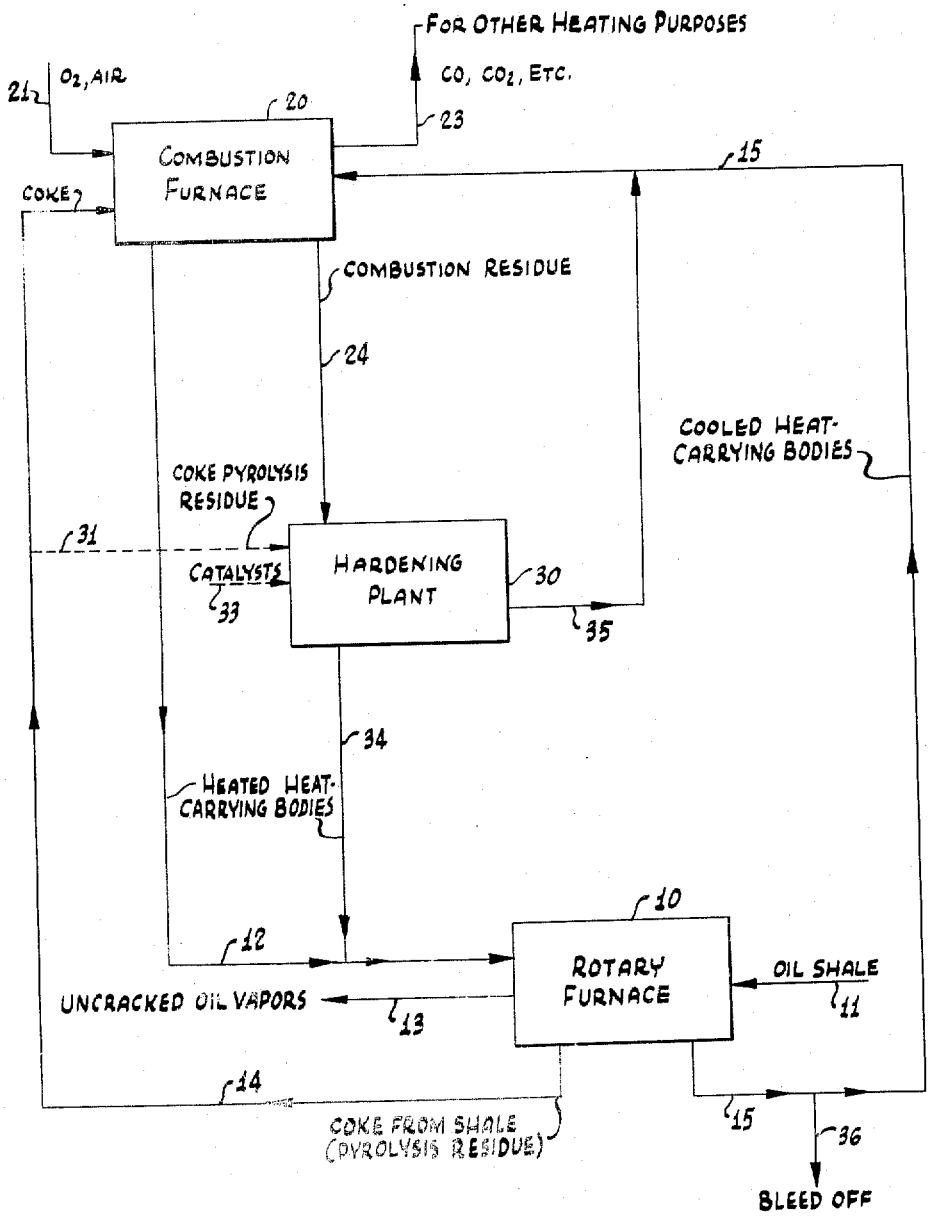
INVENTOR.
ERIK AUGUST ASPEGREN
Pulvider Mattingly & Huttey
ATTORNEYS United States Patent Office Re. 24,894
Reissued Nov. 8, 1960

24,894

METHOD OF PYROLYSIS OF FUEL

Olof Erik August Aspegren, Stockholm, Sweden, assignor to The Oil Shale Corporation, a corporation of Nevada Original No. 2,788,313, dated Apr. 9, 1957, Ser. No. 293,844, June 16, 1952. Application for reissue Oct. 6, 1958, Ser. No. 765,688

12 Claims. (Cl. 202—14)

Matter enclosed in heavy brackets [ ] appears in the original patent but forms no part of this reissue specification; matter printed in italics indicates the additions made by reissue.

In heat exchangers working on the so-called ball-furnace principle, in which heat-carriers, consisting of suitably formed material-pieces, such as balls, are admixed into a suitably fine-grained material, being under treatment in a horizontal rotary furnace, the heat-carriers are, of course, subjected to a certain amount of wear. In some cases the material detached from the heat-carriers may involve an undesirable contamination of the material treated in the furnace. In other cases the consumption of heat-carriers may involve an uneconomical operation of the process. The object of the present invention is to overcome one or both of these disadvantages as completely as possible.

The invention mainly resides in a method of heating or cooling granular and/or pulverulent materials by admixing into said material piece-formed heat-carriers of larger piece-size than that of said material, and which have in advance been heated or cooled to obtain a certain temperature-difference relative to said material, and by separating said heat-carriers from said material after they have imparted heat to or extracted heat from said material in a rotary furnace in coflow with or counterflow to said material, characterized in that piece-formed heat-carriers are employed which have been produced by binding together, for example, by sintering or agglomerating grains and/or powders, which substantially contain materials of the same chemical composition as the material to be heated or cooled, and/or oxidation-, reduction-, drying-, pyrolysis- or combustion-products of said material.

According to the invention, granular or pulverulent material is employed for the production of piece-formed heat-carriers, and substantially or approximately the same kind of material is employed as that to be treated in the furnace, or residues and/or resulting products of this material, for example, such coke as remains after pyrolysis in a ball-furnace, or ashes resulting from the combustion of such coke. Hence, in some cases the raw-material for the balls is in itself cheap, and, in other cases, it will be economical because the particles detached from the balls are of the same material as that of the material treated and thus are entered directly into the production. Under these circumstances no contamination of the material treated would occur.

The balls, that may be of substantially or approximately spherical form, may be produced in a well-known manner, possibly after sifting the material and utilizing the finer fractions, simply by suitable moistening the material with water and/or a binder and rolling the same in a rotary drum. The balls obtained in this way are afterwards preferably hardened or sintered in a well-known manner, for example, in a shaft furnace.

If the production of the balls is coordinated with the operation of the rotary furnace, the amount of heat transferred to the balls for hardening the same may in certain cases be utilized in the rotary furnace, whereby the economy of the method will be further improved. In this case, the balls while still warm may be admixed into the material in the rotary furnace.

The invention is applicable in such cases in which chemical processes are carried out in a rotary furnace and in which heat is to be introduced or extracted in the course of the process. For the purpose of facilitating such chemical processes, it may be feasible in some cases to incorporate into the heat-carriers, in some way or other, a certain content of substances acting as catalysts. This might be accomplished either by mixing or impregnating the pulverulent basic material with such substances, or by immersing the finished heat-carriers into solutions containing such substances.

As examples of possible fields of application of the invention may be mentioned, among others, the pyrolyzation of, for example, oil-shale, peat, pitch-coal, pit-coal, etc. or the reduction of metallic oxides, such as, for example, highly enriched magnetite and hematite ore or concentrate. In the former case (pyrolyzation), only heat-supply is necessary, and in the latter case (reduction), in addition, the presence of a reducing material, for example, coal- or coke-powder, hydrogen-gas, hydrocarbons, or other substances will be necessary. In both cases the presence of one or more catalysts might favorably influence the process.

The invention might also be applicable for drying fine-grained materials in a rotary furnace, in which the formation of dust would be considerably less when solid heat-carriers are employed than when a gaseous heat-carrier is concerned, which will have to flow through or over the material at a great velocity.

The invention is also applicable in cases in which it is desired to impart to a material a definite uniform temperature, either by introducing heat into or extracting heat from the material. Such temperature control may be caused to occur automatically and need not be accompanied by any other change in the condition of the material, neither of chemical nor physical nature.

If the heat-carriers and the material move in counterflow to or coflow with each other, the separation of the heat-carriers from the material advantageously occurs inside the furnace. After having been separated out, the heat-carriers are advantageously discharged from the furnace in order to be subjected to a repeated temperature-conditioning, that is, heat is imparted to or extracted from the same until their temperature reaches the correct initial value for repeated admixing the heat-carriers into the material to be treated.

The temperature-conditioning of the heat-carriers may occur, for example, by imparting heat to them in a shaft-furnace in which they are swept by, for example, hot combustion-gases. Another method consists in mixing them in a rotary furnace with another material having an excess or a deficiency of heat causing the temperature of the heat-carriers to be raised or lowered, at the same time causing the temperature of the material to be lowered or raised, respectively.

It would also be feasible in some cases for the heat-carriers to be mixed in a rotary furnace with combustible material which is wholly or partly burned whilst introducing air and/or oxygen-gas. The combustible material may consist of products from a furnace in which the heat-carriers have given up heat to the material, for example, it may consist of the coke which remains after pyrolysis of shale. Such a process can be calculated in such a way that while heat is being imparted to the heat-carriers, the latter are at the same time exerting a temperature-regulating action on the coke and ashes, so as to avoid the risk of sintering thereof.

In the heat-exchanger, a pressure differing from the atmospheric might be involved. Thus, for example, drying may occur more effectively at a subatmospheric pressure, while the chemical processes, as is well known, often proceed more favorably at pressures above atmospheric.

Referring now to the figure, a specific embodiment of one preferred form of the process of pyrolyzing oil shale is shown in schematic form.

Small sized particles of oil shale are introduced to the rotary furnace 10 along line 11. Larger sized hot heat-carrying bodies are introduced into the rotary furnace along line 12 and admixed counter-currently with the finer grained oil shale. Heat is thereby transferred to the oil shale causing its uniform pyrolysis. The pyrolysis of the oil shale results in the production of uncracked oil vapors and carbonaceous pyrolysis residue, these products leaving the furnace 10 along the lines 13 and 14, respectively.

The now cooled heat-carrying bodies leave the furnace 10 via line 15 and are sent to a combustion zone or furnace 20 which may be either of the shaft or rotary type.

The majority of the carbonaceous pyrolysis residue formed in the furnace 10, is also conveyed to the furnace 20, the combustion zone, where it is burned with oxidized gases, such as oxygen and air, entering the furnace 20 along line 21. The combustion of the pyrolysis residue in furnace 20 results in the production of flue gases, such as carbon monoxide and carbon dioxide which leave the furnace 20 along line 23 to be used for preheating purposes, and in the production of a combustion residue composed mainly of ash, and a low-carbon residue having a lower carbon content than the pyrolysis residue which leaves the furnace 20 along line 24. The heat produced by the combustion of the pyrolysis residue, is also imparted to the cooled heat-carrying bodies entering the furnace 20 preferably by the counter-current method of heat transfer shown schematically in the flow sheet, or by a co-flow operation, if desired. The thus heated heat-carrying bodies leave the furnace 20 along line 12 and are recycled to the rotary furnace 10 via line 12 to be there used again in pyrolysis of the incoming oil shale.

The rate of combustion of pyrolysis residue is adjusted so that the amount of heat transferred to the combustion residue is less than that required for an agglomerating or sintering action to occur, but, at the same time, high enough to heat the incoming heat-carrying bodies to a temperature above that which is necessary to cause pyrolysis of the oil shale in the furnace 10.

The combustion residue produced in furnace 20, composed mainly of ash and residue still containing some unburned carbon, is sent to the hardening plant 30 via line 24. The combustion residue may be there admixed with some pyrolysis residue bled off from the main pyrolysis residue line 14, and/or may be admixed with catalysts entering the plant 30 along line 33.

After the proper mixture has been made, the material is formed into hardened, approximately spherical balls in any suitable manner, such as by a pelletizing process.

The hardened balls thus produced are the heat-carrying bodies of the present invention and enter the main flow of heat-carrying bodies when needed, by being sent from the hardening plant 30 along lines 34 or 35. If the balls are hardened by a sintering process, it is preferable that they leave the plant 30 while they still retain their heat of sintering in order that this heat may be utilized in the pyrolysis.

The heated heat-carrying bodies enter the rotary furnace 10 via line 12 to pyrolyze the incoming fresh oil shale. The cooled bodies leave the furnace 10, those that have been subjected to excess wear being bled off along line 36.

What I claim and desire to secure by Letters Patent is:

1. A continuous process for pyrolyzing a particulate, solid fuel in a pyrolysis furnace at a temperature effective to produce therefrom a substantially uncracked oil effluent and a combustible, carbon-containing pyrolysis residue which comprises contacting at least part of the pyrolysis residue with an oxygen-carrying gas in a combustion zone to form an oxidized pyrolysis residue having a temperature higher than the pyrolysis temperature, forming hard agglomerates from a portion of the pyrolysis residue, said agglomerates having a particle size substantially greater than that of the particulate fuel, contacting the agglomerates with the oxidized residue until the temperature of the agglomerates is also substantially above the pyrolysis temperature, contacting the particulate fuel with the larger, hot agglomerates in the pyrolysis furnace, maintaining the fuel and agglomerates in heat exchange relationship within the furnace until pyrolysis of the fuel is effected, separating the agglomerates from the pyrolysis residue and returning the agglomerates to the combustion zone.

2. A process according to claim 1 in which the particulate, solid fuel is oil shale.

3. A process according to claim 1 in which the agglomerates are formed from unoxidized pyrolysis residue.

4. A process according to claim 1 in which the agglomerates are formed from oxidized pyrolysis residue.

5. A process according to claim 1 in which the agglomerates are formed from a mixture of oxidized and unoxidized pyrolysis residue.

6. A continuous process for pyrolyzing particulate oil shale in a pyrolysis furnace at a temperature effective to produce therefrom a substantially uncracked oil effluent and a combustible, carbon-containing pyrolysis residue which comprises contacting at least part of the pyrolysis residue with an oxygen-carrying gas in a combustion zone to form an oxidized residue having a temperature higher than the pyrolysis temperature, forming hard agglomerates from a portion of the pyrolysis residue, said agglomerates having a particle size substantially greater than that of the particulate shale, counter-currently contacting the agglomerates with the oxidized residue until the temperature of the agglomerates is also substantially above the pyrolysis temperature, counter-currently contacting the particulate shale with the larger, hot agglomerates in the pyrolysis furnace, maintaining the shale and agglomerates in heat exchange relationship within the furnace until pyrolysis of the shale is effected, separating the agglomerates from the pyrolysis residue within the pyrolysis furnace and returning the agglomerates to the combustion zone.

7. A process according to claim 6 in which the agglomerates are formed from unoxidized pyrolysis residue.

8. A process according to claim 6 in which the agglomerates are formed from oxidized pyrolysis residue.

9. A process according to claim 6 in which the agglomerates are formed from a mixture of oxidized and unoxidized pyrolysis residue.

*10. In a continuous process for pyrolyzing a particulate, solid fuel in a pyrolysis furnace at a temperature effective to produce therefrom a substantially uncracked oil effluent and a combustible, carbon-containing pyrolysis residue which comprises contacting at least part of the pyrolysis residue with an oxygen-carrying gas in a combustion zone to form an oxidized pyrolysis residue having a temperature higher than the pyrolysis temperature, heating hard agglomerates having a particle size substantially greater than that of the particulate fuel with the heat formed in the combustion zone until the temperature of the agglomerates is also substantially above the pyrolysis temperature, contacting the particulate fuel with the larger, hot agglomerates in the pyrolysis furnace, maintaining the fuel and agglomerates in heat exchange relationship within the furnace until pyrolysis of the fuel is effected, separating the agglomerates from the pyrolysis residue and returning the agglomerates to the agglomerate heating zone; the step which comprises forming hard agglomerates from the pyrolysis residue, said agglomerates having a particle size substantially greater than that of the particulate fuel,*

*11. The process of claim 10 wherein the hard agglomerates are formed from oxidized pyrolysis residue.*

*12. The process of claim 10 wherein the solid fuel is oil shale.*

References Cited in the file of this patent or the original patent

UNITED STATES PATENTS

| | | |
|---|---|---|
| 1,432,101 | Danckwardt | Oct. 17, 1922 |
| 1,573,591 | Wellman | Feb. 16, 1926 |
| 1,614,387 | Perda | Jan. 11, 1927 |
| 1,627,553 | Fasting | May 10, 1927 |

| | | |
|---|---|---|
| 1,698,345 | Puening | Jan. 8, 1929 |
| 2,420,376 | Johansson | May 13, 1947 |
| 2,582,712 | Howard | Jan. 15, 1952 |
| 2,589,109 | Martin et al. | Mar. 11, 1952 |
| 2,595,338 | Creelman | May 6, 1952 |
| 2,600,078 | Schutte | June 10, 1952 |
| 2,600,430 | Riblett | June 17, 1952 |
| 2,608,526 | Rex | Aug. 26, 1952 |
| 2,627,497 | Robinson | Feb. 3, 1953 |
| 2,643,219 | Carr et al. | June 23, 1953 |
| 2,654,698 | Phinney | Oct. 6, 1953 |